(12) United States Patent
Patel et al.

(10) Patent No.: US 9,841,756 B2
(45) Date of Patent: Dec. 12, 2017

(54) SCHEDULING INSPECTIONS AND PREDICTING END-OF-LIFE FOR MACHINE COMPONENTS

(71) Applicant: Siemens Energy, Inc., Orlando, FL (US)

(72) Inventors: Chirag B. Patel, Charlotte, NC (US);
Kai Kadau, Lake Wylie, SC (US);
Himanshu Bhatnagar, Charlotte, NC (US); Cristina C. Popescu, Marvin, NC (US); Thomas Koeppe, Fort Mill, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 462 days.

(21) Appl. No.: 14/722,175

(22) Filed: May 27, 2015

(65) Prior Publication Data

US 2016/0349723 A1    Dec. 1, 2016

(51) Int. Cl.
*G06G 7/48* (2006.01)
*G05B 23/02* (2006.01)
*G06F 17/50* (2006.01)

(52) U.S. Cl.
CPC ......... *G05B 23/0283* (2013.01); *G06F 17/50* (2013.01)

(58) Field of Classification Search
CPC ............................. G05B 21/0283; G06F 17/50
USPC .......................................................... 703/7
See application file for complete search history.

(56) References Cited

U.S. PATENT DOCUMENTS

| 7,395,188 | B1 | 7/2008 | Goebel et al. | |
| 2004/0073400 | A1* | 4/2004 | Tomita | F02C 9/00 702/181 |
| 2010/0100248 | A1* | 4/2010 | Minto | F01D 11/20 700/287 |
| 2011/0040719 | A1 | 2/2011 | Aguilar et al. | |
| 2013/0179388 | A1* | 7/2013 | Agarwal | G06Q 10/06 706/47 |
| 2014/0095133 | A1* | 4/2014 | Silva | G06Q 10/04 703/7 |
| 2014/0107948 | A1 | 4/2014 | Amann et al. | |

(Continued)

FOREIGN PATENT DOCUMENTS

EP    1179205 B1    11/2005

OTHER PUBLICATIONS

Asok Ray, Min-Kuang Wu, "Fatigue damage control of mechanical systems" Smart Mater. Struct. 3 (1994) 47-58. Printed in the UK, 13 pages.*

(Continued)

*Primary Examiner* — Dwin M Craig

(57) ABSTRACT

A method for operating a machine component under stress. The method comprises determining a probability of failure PoF(N) of the component as a function of N cycles, selecting a time-based acceptable risk limit for the component and selecting an operational profile for the component, converting the time-based acceptable risk limit to a cycle-based acceptable risk limit using the operational profile, comparing the cycle-based acceptable risk limit with the PoF(N) values to determine an operational status of the component, comparing the cycle-based acceptable risk limit with the PoF(N) values, and operating the machine component responsive to results of the comparing step.

20 Claims, 6 Drawing Sheets

(56) References Cited

U.S. PATENT DOCUMENTS

2014/0244133 A1    8/2014   De Prosperis et al.

OTHER PUBLICATIONS

PCT International Search Report and Written Opinion dated Aug. 17, 2016 corresponding to PCT Application No. PCT/US2016/031168 filed May 6, 2016 (9 pages).

* cited by examiner

SCHEDULING INSPECTIONS AND PREDICTING END-OF-LIFE FOR MACHINE COMPONENTS

FIELD OF THE INVENTION

The present invention relates to a method and system for probabilistic analysis of fatigue crack life of a machine component that is subjected to cyclic stresses during operation for use in scheduling component inspections and predicting component service life.

BACKGROUND OF THE INVENTION

During operation, machines and their constituent components are subjected to both mechanical and thermal stresses. Individual components, for example, can be subjected to direct mechanical stresses through the application of compressive or tensile forces. Thermal stresses occur when a temperature of the machine or component exceeds an acceptable operating range or when temperature excursions within the machine or component, or in the environment in which the component operates, exceed prescribed values. Such stresses may be constant or vary as a function of time.

The components in a gas turbine, for example, are subjected to cyclic mechanical and thermal stresses, especially when the gas turbine is started up, shut down or its operating parameters significantly changed. Components of steam turbines, electrical generators and other rotating and non-rotating machines are also subjected to such thermal and mechanical stresses.

Cyclic loading, both mechanical and thermal, results in material fatigue, which, in many cases limits the service life of a machine or component. Material fatigue resulting from cyclic loading conditions may also cause the initiation and growth of material cracks. The growth of these cracks is often a life-limiting mechanism for the component. Also, small cracks can nucleate from inherent material flaws, such as a preexisting flaw in a forging or from another crack-initiation mechanism, such as low-cycle fatigue.

Cyclic loading, for example the starting and shutting down of a gas turbine or a significant change in its operating condition, may cause small cracks in a component to grow incrementally. As the crack grows it may impact the structural integrity of the component. This phenomenon is referred to as stable crack growth.

But when the crack reaches a certain critical size, its growth becomes unstable (i.e., uncontrolled growth). The unstable crack grows quickly and significantly, possibly resulting in component failure.

The number of cycles N at which unstable crack growth begins is called the fatigue crack life of the component. The crack growth rate, which directly impacts the value of N, can be estimated using linear elastic fracture mechanics (LEFM) and finite element analyses (FEA) for estimating a transient stress field to which the component is subjected.

Due to the uncertainties associated with material properties and initial flaw size and the complexities of the LEFM and FEA analyses, estimating the crack growth rate and thereby a service life of a component is a difficult and tedious process. Therefore, the design of some components may not consider fatigue crack growth or the design may be extremely conservative relative to fatigue crack growth. As a result of such conservative approaches, the component may be designed with conservative features (e.g., material, dimensions, tolerances, etc.), its operating conditions may be limited (e.g., minimum starting metal temperatures), or it may be prematurely inspected, serviced, or taken out of service, i.e., good components are discarded due to overly conservative assumptions. These premature service intervals or premature component replacements tend to add significantly to system cost. A more accurate analysis of fatigue crack growth would permit a longer interval between component servicing and/or a longer useful service life for the component.

Fatigue crack life calculations can be performed using a deterministic or a probabilistic approach.

Traditional deterministic calculations of fracture mechanics (FM) service life of a component, such as a gas turbine rotor disc, result in conservative values as a means to compensate for various unknowns in the deterministic approach. This approach uses minimum (or maximum as appropriate) material properties to estimate a component service life. Conservative estimates of material properties and initial flaw sizes are used, as well as worst-case scenarios and significant safety factors. Using these assumptions, the fatigue crack life of the component is then conservatively estimated by LEFM or known extensions of that technique. Generally the fatigue crack life is measured in years of operation or number of component cycles (e.g., start-ups and shut-downs).

As applied to a gas turbine rotor disc, these conservative estimates may cause unnecessary replacement of a disc or may suggest considerable over-design of discs. These scenarios result in decreased service life and increased life cycle costs of gas turbine rotors. Also, the conservative approach schedules service inspections based on availability and the capabilities of inspection techniques, rather than on inspections that are required to reduce the risks of continued component operation.

For instance, a gas turbine includes, according to one design, about twenty rotor discs (also referred to as compressor discs or turbine discs) stacked horizontally end-to-end to form a gas turbine rotor. See FIG. 2 and the discussion of FIG. 2 below.

The deterministic approach may yield a fatigue crack life for a rotor disc of N=3000 engine starts, for example. According to the deterministic approach, this result is based on minimal material properties and maximum assumed flaw size at the worst possible location on the rotor disc, i.e., where the stress magnitude is greatest.

This approach falls under the so-called safe-life design philosophy and has been used for land-based heavy-duty gas and steam turbines. The deterministic fracture mechanics calculations are based on extremely conservative design margins. They assume the worst case scenario in terms of manufacturing and operations; that is, the disc material will be the worst possible, a large flaw will exist in the worst location (in terms of mechanical and thermal stresses) on the disc forging, and the gas turbine is always started under extreme ambient conditions.

For example, as illustrated in FIG. 1, fracture mechanics calculations determine a service life of a rotor disc 4 by assuming that large forging flaws exist at high-stress locations identified by a reference character 5.

A drawback of employing such deterministic fracture mechanics calculations for component analysis is the use of a single component location or a few locations, and the assumption of minimum/maximum material properties at those locations. Erroneous conclusions may result from these calculations. A more realistic distribution of the material properties and flaw sizes throughout the component is not used in the deterministic approach. The safety-factor of the deterministic approach may thereby lead to an overly conservative design.

In reality, the material properties, flaw size, and flaw locations vary among rotor discs and within a disc. It is highly improbable that the largest forging flaws will be present at the most critical locations in a disc with the worst material properties.

In lieu of a deterministic approach, a probabilistic approach may yield more realistic service life values and inspection intervals. To quantify the probability of a disc failing due to a fracture, probabilistic fracture mechanics (PFM) analysis is used.

In a probabilistic analysis of gas turbine rotor discs, variations in material properties, flaw size and location distribution are used to determine a probability of failure, PoF(N), after N operational cycles. A typical probability-of-failure value for a gas turbine rotor disc after N=3000 starts is on the order of:

$$PoF(3000) \sim 1/1,000,000$$

This result indicates that after about 3000 starts, 1 of 1,000,000 rotor discs will have failed.

Advantages and disadvantages of the probabilistic and deterministic approaches have been discussed at length in the pertinent literature. Both approaches can be used to conduct failure analyses of a gas or combustion turbine and its constituent components, in particular its rotating turbine discs.

The teachings of the present invention can be applied to, for example, a gas or combustion turbine, which is one type of a internal combustion engine. The principles of the invention can also be applied to any machine that experiences stresses due to any causative agent during start-up, operation, or shut-down, such as machines comprising a heavy mass rotating at high speeds, e.g., steam turbines, turbo-pumps, and electrical generators.

A gas turbine operates by compressing and accelerating an air stream within a compressor. Fuel is injected into the air stream in a combustor or combustion chamber, where ignition of the fuel occurs. Ignition of the fuel creates a hot combustion gas flow that is directed to a turbine and causes it to rotate. The combustion gas stream (also referred to as a working gas) expands as it enters the turbine, which includes rows of stationary guide vanes and rotating blades connected to a turbine shaft. The expanding gas flow is accelerated by the guide vanes and directed over the rotating blades, causing the blades and thus the turbine shaft to spin. The spinning shaft provides a mechanical torque output and also turns the compressor. After passing through the blades and vanes the working gas flow enters a turbine exhaust casing.

FIG. 2 depicts a prior art gas or combustion turbine 10, generally including a compressor 12, a combustion chamber 14 and a turbine 16. The compressor 12 inducts and compresses ambient air. The compressed air then enters one or more combustors 28 in the combustion chamber 14, where the compressed air is mixed with fuel. The air-fuel mixture ignites to form a hot working gas. The working gas is directed to the turbine 16 where it expands through alternating rows of stationary guide vanes 22 and rotating blades 18 to generate mechanical forces that turn a shaft, which is not specifically shown in FIG. 2. The expanded gas exits the turbine 16 via an exhaust casing (not shown). The rotating blades 18 are attached to rotor discs 40 that are horizontally stacked to form a segment of the turbine shaft.

BRIEF DESCRIPTION OF THE DRAWINGS

The invention is explained in the following description in view of the drawings that show.

DETAILED DESCRIPTION OF THE INVENTION

Figure 1:
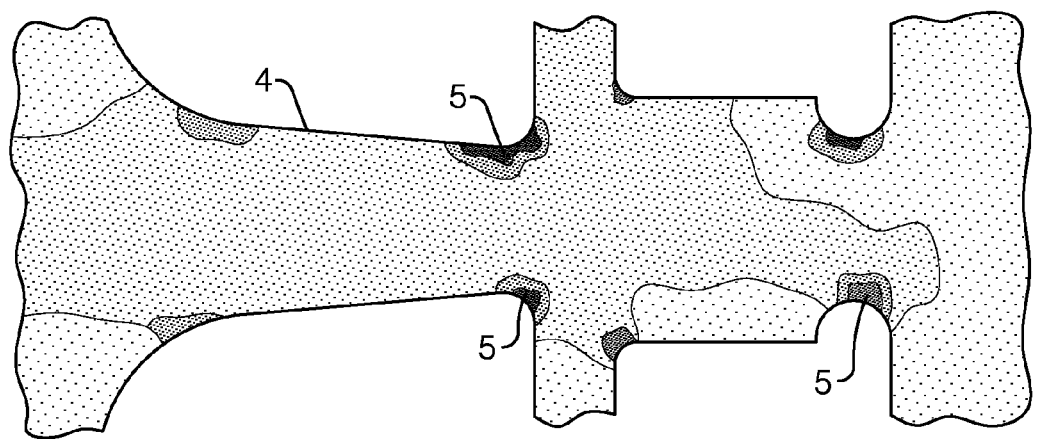
FIG. 1 illustrates critical locations of a rotor disc for use in computing a fracture mechanics service life of the rotor disc.

One derivative of the probabilistic fracture mechanics approach to determining a probability of failure value is referred to as direct simulation probabilistic fracture mechanics (DSPFM) and is described in published patent application number 2014/0107948 (attorney docket number 2012P16904), which is commonly owned and incorporated by reference herein. DSPFM can be used to analyze machine components or entire machines.

DSPFM is a direct simulation Monte-Carlo approach that uses high-power computing techniques to perform billions of fracture mechanics simulations, positioning material properties and flaws of different sizes and at different locations over the entire component, for example where the component is a gas turbine rotor disc. As is known by those skilled in the art, the material properties may be different at different locations on the component and thus the DSPFM technique should yield more realistic results. In the DSPFM simulation the flaws are distributed over the component based on the probability of a flaw at a given location. The crack growth path (rate, direction, and extent of growth) is determined according to a calculated stress field (e.g., according to a first principal stress field, or another projection of the stress tensor) using, in one embodiment, linear elastic fracture mechanics techniques. No manual positioning of cracks or other manual processes are involved in the DSPFM process.

The present invention presents a risk-based approach for making decisions regarding the fracture mechanics service life of a component, such as a rotor disc. The invention extends the DSPFM methodology to encompass component service life decisions and decisions related to replacing, inspecting and redesigning a component. These decisions are based on acceptable risk limits established by the machine operator and based on risk curves that depict the probability of failure (in one embodiment as a function of component or machine cycles) derived from DSPFM techniques. The invention also optimizes component inspections including inspection scheduling, regions of the component to be inspected, and the types of tests to be performed during each inspection.

The DSPFM method runs Monte Carlo simulations with a large number of fracture mechanics calculations using independent samples of the input variables, i.e., material properties, flaw sizes and flaw locations. Material property distributions may, to an extent, be based on experimental test data. Flaw size and flaw location distributions may, to an extent, be derived from a database of ultrasonic testing results.

If M is the Monte Carlo sample size (typically on the order of millions to billions of samples), the probability of failure (PoF) after a number of cycles N can be obtained from $$PoF(N)=(\text{number of samples failing before } N)/M$$

The DSPFM method yields a PoF(N) curve that is essentially a cumulative distribution function that provides a probability of failure of a disc (or another component) as a function of a number of operational cycles N of the rotor. An exemplary PoF(N) curve is illustrated in FIG. 3 where the Y axis is a log scale.

Figure 3:
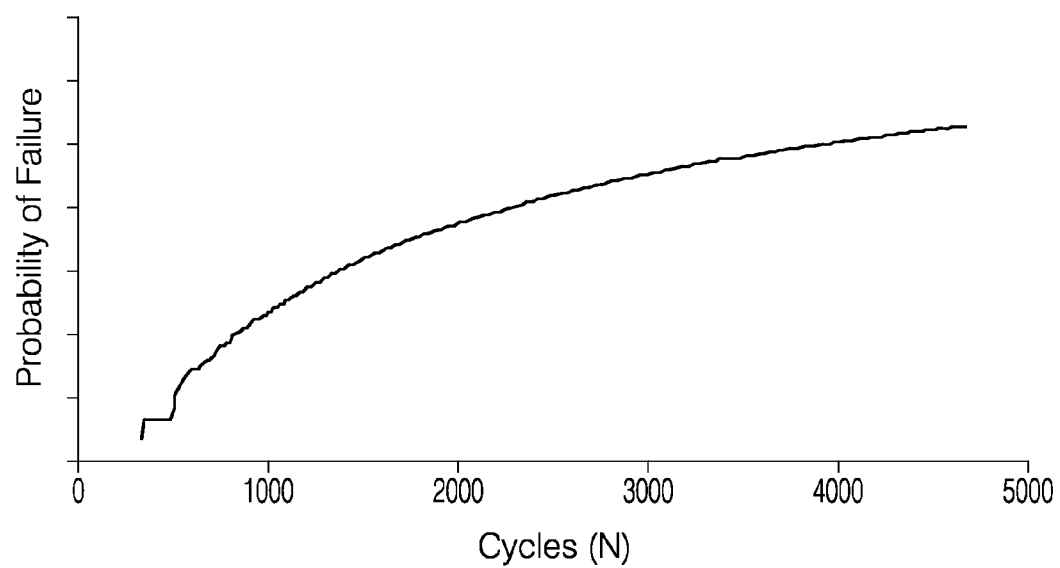
FIG. 3 illustrates a typical probability of failure curve versus a number of cycles N for a machine component. The probability of failure is shown on a log scale.
Figure 2:
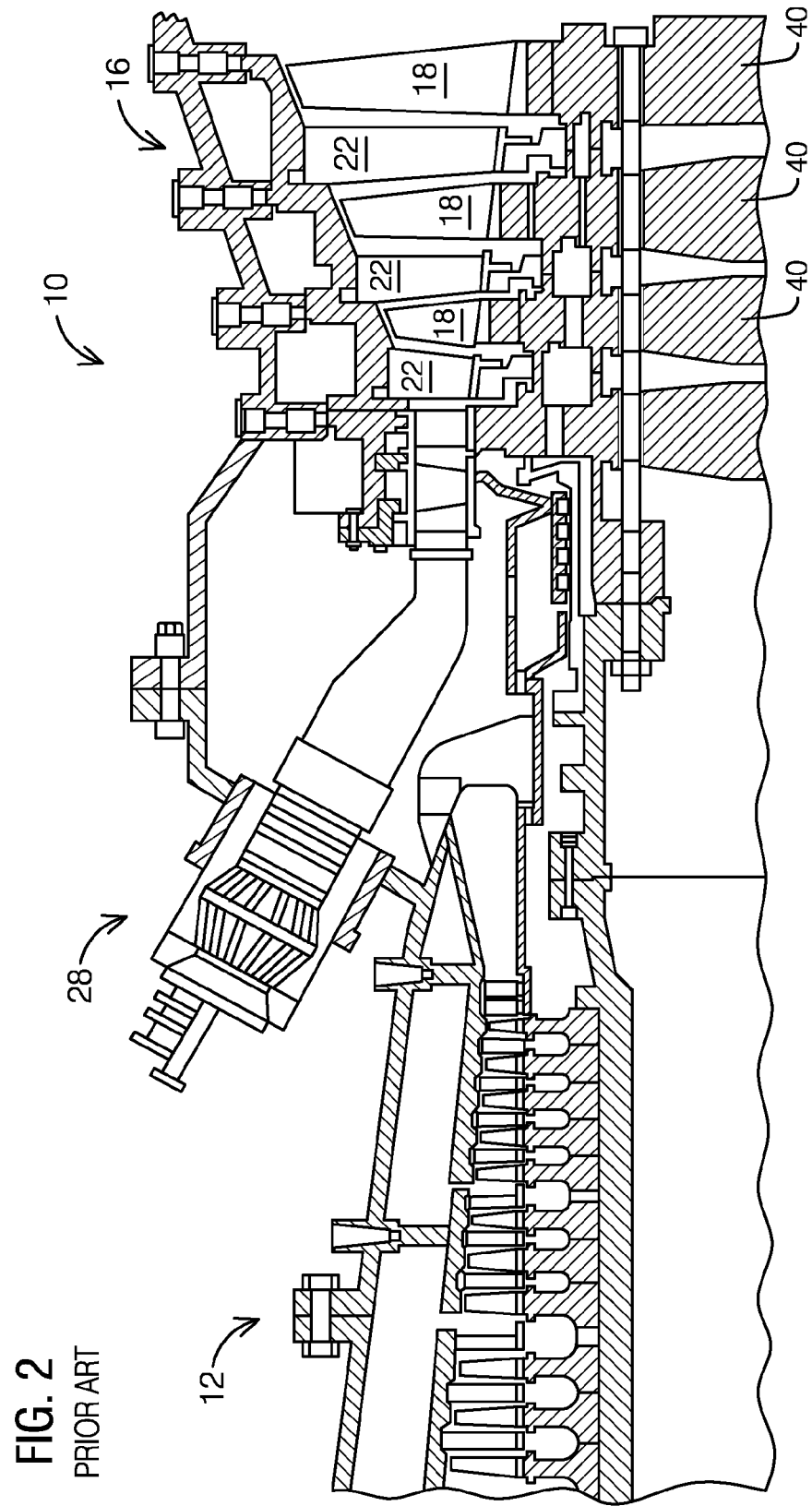
FIG. 2 is a partial cross-sectional view of a prior art gas turbine.

In the context of FIG. 3, cycles, the abscissa value in FIG. 3, refer to a start-up and shut-down sequence. That is, a single cycle for the purposes of FIG. 3 is defined as a start-up followed by a shut-down of a gas turbine engine. In other contexts a cycle is not necessarily equal to the number of machine starts, as the former can be much larger than the latter. For example, consider the number of different cycles an airplane experiences during a single flight, e.g., as it accelerates, decelerates, climbs and descends.

Figure 4:
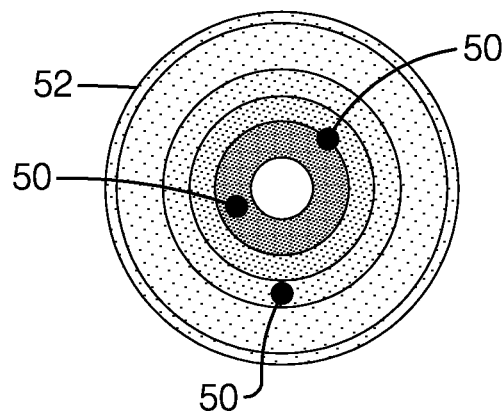
FIG. 4 illustrates a rotor disc with three different potential flaw locations.

Rotor disks (or in general any other component) have uncertainties in material properties and flaw characteristics. Thus million to billions of DSPFM simulations are required to develop a reasonably accurate probability of failure value. The parameters of interest in determining the fracture mechanics life in these simulations include material properties, fracture toughness, fatigue crack growth characteristics, flaw size, and disk region. Three different locations of interest, representing different flaw locations and material properties, are depicted by dots 50 in FIG. 4, which illustrates a rotor disc 52 (selected from M rotor discs in a gas turbine). To evaluate the probability of failure (PoF) of a population of rotor disks in a specific gas turbine fleet, M fatigue crack growth simulations are performed to calculate the PoF value.

The present invention teaches a methodology for using these probability of failure results, including graphical curves that embody these results, for making decisions regarding rotor disc service life (or rotor service life since the failure of a rotor disc is generally considered failure of the rotor) and for optimizing non-destructive testing (typically ultrasonically testing) with respect to the timing and extent of such tests.

For making these decisions regarding the service life of a component and the frequency and nature of component inspections the machine operator needs to establish criteria upon which these decisions are based.

In the case of a deterministic component evaluation, the machine operator needs to first determine an expectation of the number of operational cycles that a rotor disc (or an entire rotor) will undergo before failing. This determination takes into account the cost of replacing the disc (including, for example, disc cost, labor cost and the cost of gas turbine down time), historical failure experiences with gas turbine rotors and discs, etc. If the number of deterministically-determined operational cycles for a turbine disc exceeds the operator's expectation for the life of the disc then use of the disc is acceptable.

For making decisions based on probabilistic information, the operator must first determine an acceptable risk limit. A risk limit is a measure of the risk-of-failure (in probabilistic terms) that the operator is willing to accept during a given operational time interval. The operator selects an acceptable risk limit to ensure that the risk to the public, or in the case of a gas turbine to power plant employees, is reasonably low and on the order of other risks tolerated by the general populace without undue consideration. The acceptable risk limit can be expressed as a function of operational time (e.g., operational years) or as a function of operational cycles.

In terms of safety, the acceptable risk limit (e.g., tolerable or acceptable limits for flight safety or safety of employees in a manufacturing plant) is typically expressed on a per-year basis. For example, the annual risk of dying during air travel for a person traveling on ten flights/year has been determined to be on the order of one per million.

An annual acceptable risk limit for gas turbine rotors has been established using criteria developed by the assignee of the present application, and based on standards from organizations such as the Health and Safety Executive (HSE), the Nuclear Regulatory Commission (NRC), and the International Standards Organization (ISO).

The gas turbine operator may use the established acceptable risk limit or select a different risk limit. For example, the operator may use an annual acceptable risk limit for the complete rotor of 1/10 per year. This translates to a PoF that grows by a 0.1 a year or 0.1/365 per day. After 10 years the acceptable PoF then is at 1. The probability of failure must always be less than the acceptable PoF for the operator to continue operating the gas turbine or any other device or component. If the probability of failure is greater than this value, the operator will remove it from service, conduct tests on critical components, operate it under less stressful conditions, etc. until the risk is sufficiently reduced. Transition periods of higher risks might be acceptable depending on exact circumstances and legal requirements.

The operator can establish a risk limit for each gas turbine in the fleet where that risk limit is based on unique characteristics and operating conditions of each gas turbine or a single risk limit for the entire gas turbine fleet.

Additionally, the operator can establish more than one risk limit value for a gas turbine. For example, when the probability of failure (as a function of operating cycles) reaches a first risk limit the gas turbine is inspected. When the probability of failure reaches a second risk limit the gas turbine is removed from service (i.e., the service life has been reached).

The annual acceptable risk limit for a total rotor failure is denoted $p_{acc}$. For low failure probabilities this value can be approximated by the sum of the acceptable risk limits of rotor individual components (e.g., discs and shaft). Since the acceptable risk limit is expressed on an annual basis, $p_{acc}$ must be compared to an annual risk or probability of failure (for a component or for the entire rotor) to yield a valid comparison.

The selected annual risk limit can be expressed as the risk of failure of the entire rotor or the risk of failure of an individual rotor disc (or another rotor or gas turbine component). The operator can select the metric of choice and compute the attendant probability of failure values as a function of operational cycles.

As an alternative to examining the annual risk limit of the entire rotor and all of its constituent parts, the operator can reduce the DSPFM computational burden by analyzing only the most critical rotor components (for example as determined by a regular deterministic analysis or based on prior experiences). For example, for certain critical discs that are C in number with a total number of rotor components N, the value $C*p_{acc}/N$ determines the annual risk limit for a cluster of critical components comprising C critical components. With this approach that focuses on the most critical components, the rotor discs and shaft for example, it is generally not necessary to analyze all gas turbine parts if one is reasonably certain that the components that have not been analyzed present a lower risk of failure than the components that have been analyzed.

This approach is inherently conservative as it also assumes that non-critical components consume the same risk of failure, even those that are in fact lower in risk that are not calculated. Further conservatism can be achieved by assigning an allowable risk per critical component according to $C*p_{acc}/(N*C)=p_{acc}/N$. The further conservatism arises because certain C components are more likely to fail than other ones of the C components. That is, this approach implicitly assumes that low risk-of-failure discs contribute the same probability of failure value to the total probability of failure value as high risk-of-failure discs.

Note that the selected acceptable risk limit, designated $p_{acc}$, is conventionally defined on per-year basis. It is generally not defined based on number of cycles or starts for a machine or a gas turbine.

But the probability-determined value of PoF(N) is typically expressed as a function of N cycles or starts. To compare the acceptable risk limit and the PoF(N) value, both must be expressed in the same units. According to one embodiment of the present invention an acceptable risk limit value expressed on an annual basis is converted to an acceptable risk limit expressed on a cycle basis. This conversion allows the analysis to be conducted on the basis of cycle values as both the acceptable risk limit and the probability of failure are functions of the number of cycles N.

To reach valid conclusions about the operating life of a disc and the frequency and nature of disc inspections, it is necessary to transform the acceptable risk limit $p_{acc}$ from a "per year" basis to "per cycle" basis. By assuming a machine cycle profile, a value of an acceptable risk per year can be transformed to an acceptable risk per cycle. The risk is cumulative through the number of cycles, increasing as the number of cycles increases.

This conversion can be accomplished by assuming an operational profile for the component. For example, if the operational profile for the machine involves 1000 cycles per year (making a simplifying assumption that all cycles occur under the same operating conditions), then a risk of failure of 1/10,000 in one year converts to a risk of failure of 1/10,000 for 1000 cycles or a probability of failure of 0.1 for one year (1000 cycles) of operation.

To make the conversion, the operator can use a generic operational profile for all gas turbines in its fleet or use a specific and unique start profile for each individual gas turbine.

With both the PoF for a rotor (or for individual rotor components such as a disc) and the acceptable limit for rotor (or for individual rotor components such as a disc) expressed on a per cycle basis, both can be plotted on the same graph. The PoF curve is in fact a cumulative distribution function based on operational cycles (instead of years of operation). The service life (in number of operational cycles) can also be depicted on the same graph as a vertical line at a point where the risk of failure reaches the acceptable risk limit.

Figure 5:
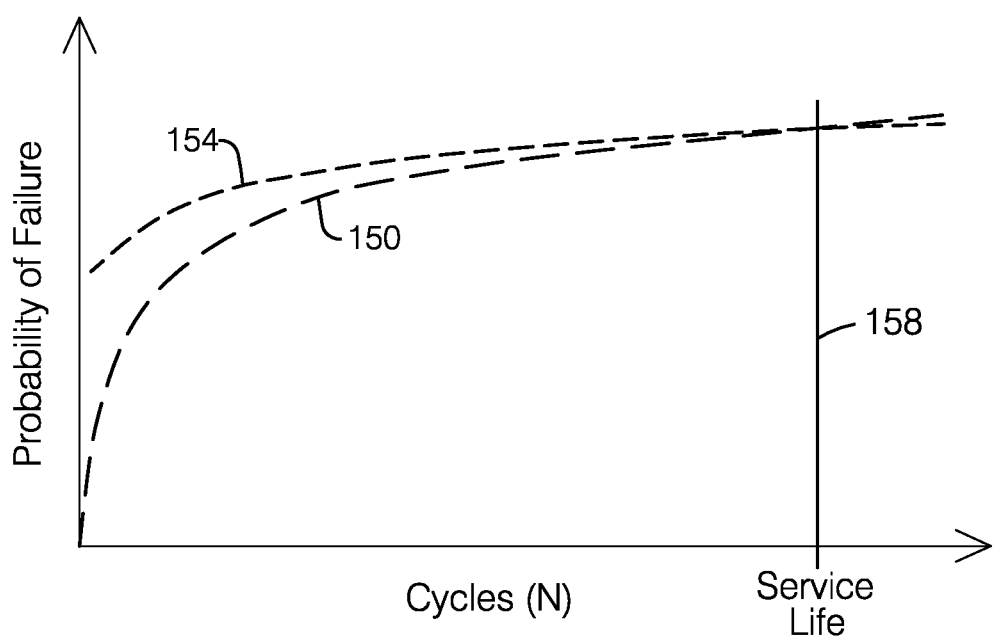
FIG. 5 illustrates a graph for comparing a rotor probability of failure and an acceptable risk limit for the rotor. The probability of failure is shown on a log scale.

Such a chart is illustrated in FIG. 5 (the Y axis units are logarithmic values), where a curve 150 indicates a probability of failure (PoF) based on DSPFM calculations and a curve 154 represents a risk limit based on an acceptable probability of failure as established by the machine operator. Both curves are functions of the number of operational cycles per year. Both the acceptable risk limit and the assumed cycles per year (the operational profile, including the conditions under which those cycles are performed) are essentially operator driven as each operator will have its own acceptable risk limit curve, cycles per year, and conditions associated with each cycle.

With reference to FIG. 5, if the PoF curve 150 for a rotor is below the acceptable risk curve 154 for that rotor, then the rotor can be operated safely with an acceptable (i.e., low) probability of failure. The gas turbine of which that rotor is a component can be operated without a substantial risk of failure since the probability of failure is below the acceptable risk limit for that gas turbine.

The service life of the rotor is determined by the intersection of the curves 150 and 154 and is further denoted by the vertical line 158 in FIG. 5. Since the risk limit curve 154 is essentially operator driven, the intersection of the curves 150 and 154 and the location of the vertical line 158 are also essentially operator driven.

If the analysis is conducted on a per component basis (where a component is a rotor disc, for example) the general shape of the PoF curve for each component will be similar to the shape of the PoF curve 150 of FIG. 5. There will be C such curves with one curve for each component C since each component experiences different operating conditions and therefore exhibits a different probability of failure and a different probability of failure curve. The acceptable risk limit curve (like the curve 154 of FIG. 5) will be determined from the value $p_{acc}/C$ and will be the same for each component C as determined by the operator.

Figure 6:
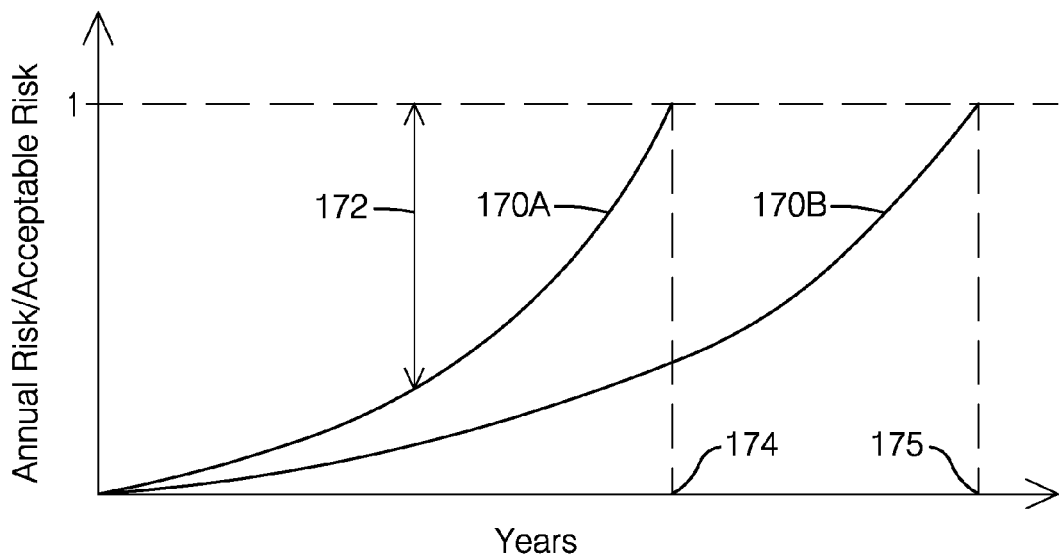
FIG. 6 illustrates a normalized graph of assumed risk divided by acceptable risk as a function of operating years for a gas turbine rotor.
Figure 7:
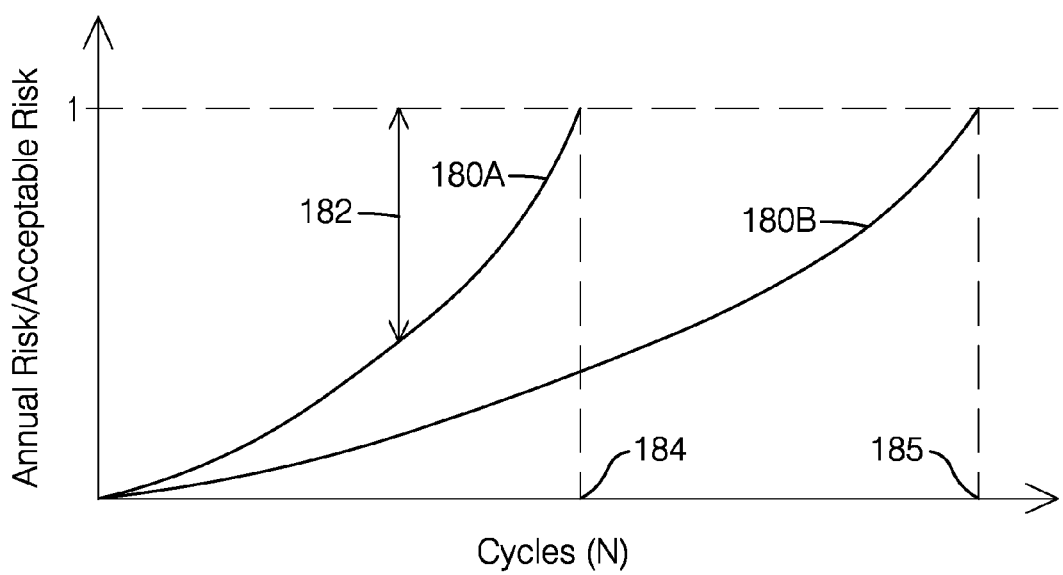
FIG. 7 illustrates a normalized graph of assumed risk divided by acceptable risk as a function of operating cycles for a gas turbine rotor.

In another embodiment, the operator can normalize the operating condition annual risk by the acceptable risk limit, i.e., divide the annual risk by the acceptable risk, for a component. This value is indicated on the Y-axis of FIGS. 6 and 7 for two different operating conditions in each figure. FIG. 6 is a plot based on years of operation and FIG. 7 is a plot based on cycles. The dashed horizontal line in each figure is the value where the annual risk/acceptable risk=1.

Risk margin curves 170A (operating condition 1) and 170B (operating condition 2) and a risk margin denoted by an arrowhead 172 are illustrated in FIG. 6. End of service life for the component is indicated at time 174 for operating condition 1 and a time 175 for operating condition 2.

For parameters expressed on a cycle basis, FIG. 7 illustrates risk margin curves 180A (operating condition 1) and 180B (operating condition 2) and a risk margin denoted by an arrowhead 182. End of service life for the component is indicated at a number of cycles 184 for operating condition 1 and a number of cycles 185 for operating condition 2.

Since a specific operating condition comprises a number of cycles per year, these two X-axis parameters are easily transformed as described elsewhere herein. In both FIGS. 6 and 7 the risk margin is given by a distance between the normalized risk curve and a value of one on the Y-axis (where the annual risk/acceptable risk equals 1). Where the normalized risk curves 170A and 170B in FIGS. 6 and 180A and 180B in FIG. 7 intersect with the horizontal line at the Y-axis value of 1 the risk of operation is unacceptable (i.e., the annual risk and the acceptable risk are equal) and the component needs to be replaced. Thus at times 174 and 175 or after cycles at X-axis values 184 and 185, the component has reached its end of service life.

Without the benefits of the present invention, ultrasonic testing (or any other nondestructive testing) is performed on the entire component and therefore is time consuming and expensive. But these tests are important as they can identify components with defects for replacement. The present invention allows these inspections to be targeted to specific components and to specific component regions, and scheduled as needed.

Such inspections and tests, whether or not resulting in the replacement of a component, can result in a reduced probability of failure (PoF) value. If the inspection identifies flaws that are not acceptable, the component is discarded and replaced by another component. If the test results indicate that the component does not need to be replaced, then the operator will be confident that the existing component is good. In either situation the probability of failure of that component is reduced.

Figure 8:
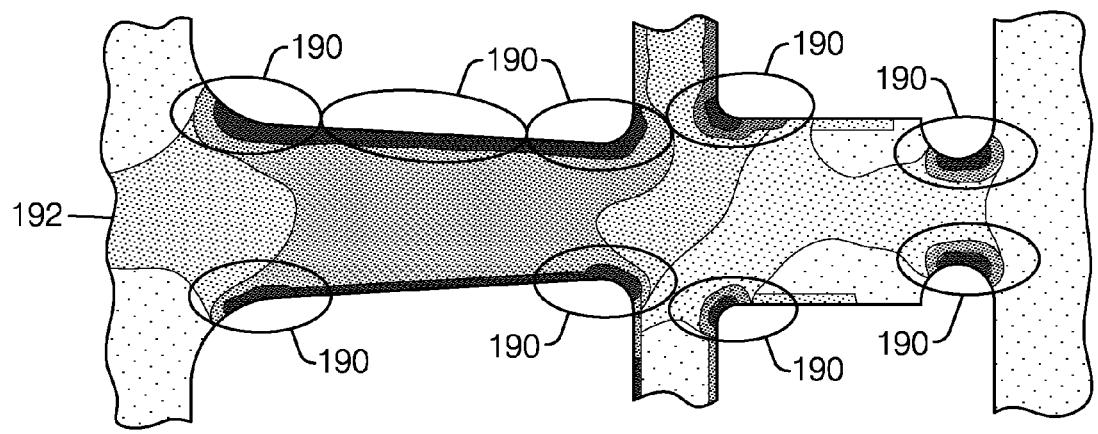
FIG. 8 illustrates a portion of a rotor disc showing regions of the rotor disc having a high probability of failure.

The DSPFM results can identify the most effective ultrasonic testing locations on the components (e.g., discs) by calculating risk contour maps, which essentially identify those regions with a high probability of failure. FIG. 8 illustrates critical regions 190 of a relatively thin compressor disc 192 encircled by ellipses, i.e., regions where the component is prone to failure. The results presented in FIG. 8 are based on a transient FEA analysis and material properties that are changing with temperature; they do not necessarily correlate with high stress areas on an example disc as determined by DSPFM calculations.

DSPFM results can also be used to determine risks associated with continued operation after an inspection is conducted only on critical regions. DSPFM can also be used to optimize the inspection technique further in terms of outage duration, outage date, and the extent of the inspection. For instance, postponing an inspection for a business reason might still result in an acceptable risk while saving the gas turbine operator money.

Figure 9:
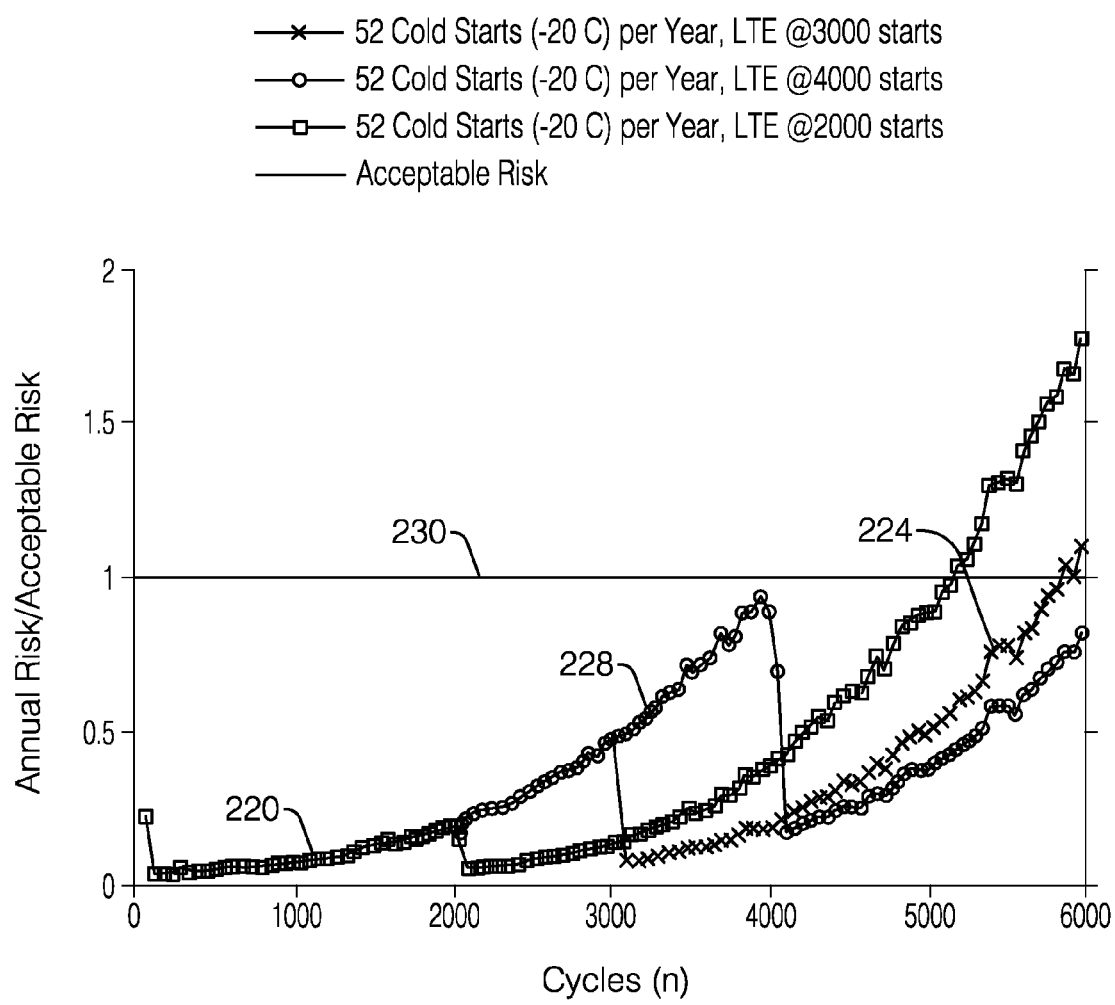
FIG. 9 illustrates a normalized graph of risks associated with inspections conducted after various numbers of gas turbine cycles and the risk associated with regular and delayed inspections.

FIG. 9 shows the effects of service life extensions when an inspection is performed at 2000 cycles (curve 220), 3000 cycles (curve 224) and 4000 cycles (curve 228). As shown, when the inspection is performed at about 4000 cycles the service life can be extended to at least 6000 cycles (sometimes referred to as a second life of the gas turbine) as at 6000 cycles the curve 228 has not reached a horizontal line 230 that identifies the acceptable risk limit, i.e., where the annual risk divided by the acceptable risk is one. The explanation for this outcome is simply that cracks have grown larger and are therefore more easily detected during an inspection at 4000 cycles. The second life cycle, i.e., between 3000 and 6000 cycles, is also more critical as the flaws have grown in size and are therefore now growing more aggressively with a greater potential to cause a failure.

For an inspection performed at 3000 cycles the ratio of the annual risk to the acceptable risk reaches the limit value of one at about 6000 cycles. For an inspection performed at 2000 cycles the ratio exceeds one at about 5000 starts.

The present invention permits a "fine tuning" of inspection timing. For example, if the inspection is performed at about 2000 cycles, irrespective of the inspection results, the service life of the component cannot exceed about 5000 cycles as the curve 220 exceeds the service life limit of the line 230 at about 5000 cycles. But if the inspection is delayed until about 4000 cycles then the service life extends beyond 6000 cycles.

The DSPFM technique of the present invention also permits a more targeted inspection where only the critical regions, as determined by DSPFM, are inspected.

Alternatively, the gas turbine operator can perform opportunity-inspections prior to a planned outage but at a time when the outage will not be detrimental to efficient operation of the gas turbine. Since the probability of failure value, including the inspections, can be simulated by DSPFM calculations, one can optimize the schedule and inspection tests, including inspected areas and opportunity inspections, with respect to efficient operation of the gas turbine. In all cases, however the salient boundary condition is that the actual probability of failure must always remain below the acceptable risk.

Of course for any inspection, the operator can conduct a more thorough inspection of critical locations, using ultrasonic testing for example, to further reduce the probability of failure.

Figure 10:
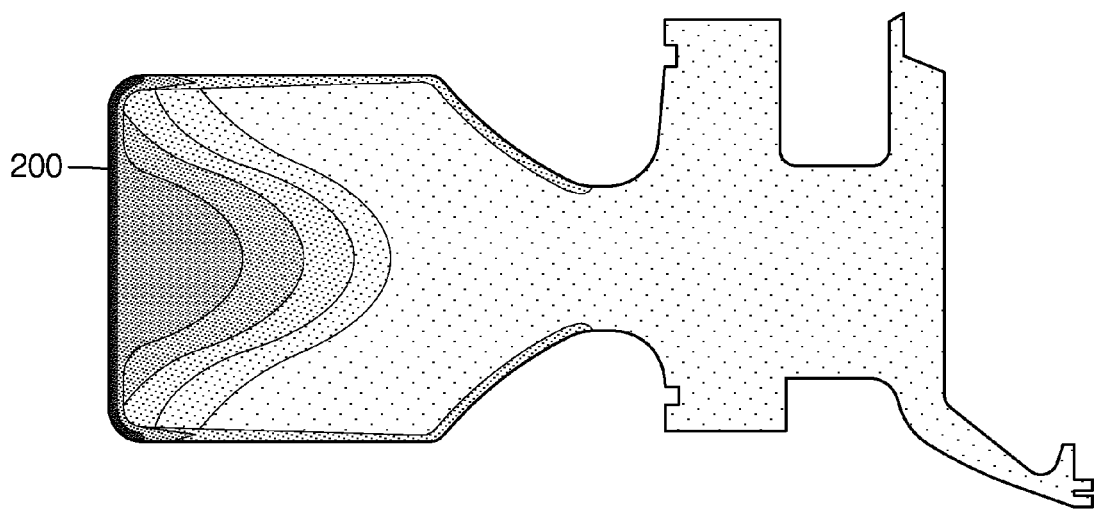
FIG. 10 illustrates a portion of a different rotor disc than depicted in FIG. 8, showing regions of the rotor disc having a high probability of failure.

FIG. 10 illustrates the risk contour of a spacer disc or mini disc 200 of a gas turbine. The disc 200 embodies a different design, has a different purpose and is a component of a different gas turbine model than the disc 192 illustrated in FIG. 8. Specifically, the disc 200 is 'shorter', does not carry a turbine blade and accumulates stresses at different locations (i.e., near the bore area) than the disc 192.

Clearly, an inspection of only regions near the bore, with focus on near-surface defects, is needed during an inspection for extending the life of the disc, e.g., extending the life beyond the typical 3000 life cycles for a rotor disc. Furthermore, the number of cycles at which the life time extension is performed influences whether the calculated risk is still below the acceptable risk limit per year per gas turbine.

Although the teachings of the present invention of conducting and optimizing inspections and service life decisions based on calculated risks have been described with reference to a gas turbine and at times in particular to the rotor discs of a gas turbine, the teachings are not limited to a particular machine or to specific components of a particular machine. Any machine and any of its constituent components that are subject to analyses to determine a probability of failure and an acceptable risk limit (on the basis of operational time or operational cycles) can be analyzed as the rotor discs as described herein. Such an analysis allows the machine operator to determine when the component should be replaced or inspected (and the nature of each inspection) because the acceptable risk margin for replacement or for inspection has been reached.

In particular, the embodiments described herein can be applied to not only gas turbine and their rotor discs, but also to other components of turbo-machinery such as steam turbine rotors, blades, vanes, wind-turbine components, electrical generators, etc.

Other applications may include, for example, in the manufacturing of integrated circuits, such as CPUs (central processing units) and GPUs (graphical processing units).

The concepts of a risk-based life and quality control as related to inspection can be beneficial as production outputs of these integrated circuits are substantial.

For each of the aforementioned applications the machine operator has to determine an acceptable risk limit where that limit depends substantially on the consequences of a failure. For instance, the acceptable risk limit for a rotor or gas turbine failure per year must be very low as consequences of a failure can be severe, i.e. a failure can cause fatalities. For other components, such as blades and vanes, the risk limit can be based on various factors such as severity of consequences, replacement cost of the failed component, and loss in productivity or profit due to loss of the gas turbine. In the case of blades and vanes the acceptable risk limit may be driven more by business decisions, as in the case of a blade or van failure a forced outage is likely.

In many of the embodiments described herein the analyses of the probability of failure and the acceptable risk limit are conducted on a cycle basis. That is, both of these parameters are expressed on a per cycle basis. In certain embodiments the acceptable risk limit is expressed on an annual basis and is converted to a per cycle basis for comparing to the probability of failure value, which is expressed on a per cycle basis.

In another embodiment the analysis is performed on an annual basis. To perform the comparison on an annual basis, the probability of failure value is converted from a per cycle basis to an annual basis by determining an annual operational profile for the gas turbine or rotor disc (based on an actual operational profile of a gas turbine, for example). An annual operational profile comprises a typical number of cycles. For example, assume a probability of failure after 10,000 cycles is 0.00001 and the 10,000 cycles constitute one year of operation. Then the probability of failure after one year is 0.00001.

Thus the probability of failure and the acceptable risk limit can be expressed on a per cycle basis or annual (or another time interval) basis. When both of these parameters are expressed using the same variable they can be validly compared.

In one embodiment the probability of failure as a function of N cycles is determined by defining a plurality of representations of a machine component from material property scatter data and flaw-size scatter data of the component, wherein each representation is defined by one possible material condition and flaw-size condition. Then for each individual representation, selecting a component location and determining whether the individual representation fails after a given number of cycles N due to crack growth at the selected location, the crack growth determined on the basis of the material condition and the flaw-size condition at the selected location, wherein failure of the individual representation is determined if the crack growth is determined to be unstable. The probability of failure PoF(N) is determined from the equation:

$$PoF(N) = N_f/S$$

where, $N_f$ is the number of representations that are determined to have failed after N cycles and S is the total number of representations.

The invention further comprises an apparatus comprising a storage device and a processor connected to the storage device. The storage device stores instructions for controlling the processor. The processor executes the instructions for performing the steps of: determining a probability of failure of the component as a function of N cycles, PoF(N), selecting a time-based acceptable risk limit for the component, selecting an operational profile for the component, converting the time-based acceptable risk limit to a cycle-based acceptable risk limit using the operational profile, comparing the cycle-based acceptable risk limit with the PoF(N) values, and operating the machine component responsive to results of the comparing step.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for operating a machine component under stress, the method comprising:
    determining a probability of failure of the component as a function of N cycles, PoF(N);
    selecting a time-based acceptable risk limit for the component;
    selecting an operational profile for the component;
    converting the time-based acceptable risk limit to a cycle-based acceptable risk limit using the operational profile;
    comparing the cycle-based acceptable risk limit with the PoF(N) values; and
    operating the machine component responsive to results of the comparing step.

2. The method of claim 1 wherein the step of operating the machine component comprises one of conducting component maintenance, scheduling a component downtime, scheduling a maintenance task, testing the component, and removing the component from service.

3. The method of claim 1 wherein the step of determining comprises using direct simulation probabilistic fracture mechanics.

4. The method of claim 3 wherein the direct simulation probabilistic fracture mechanics method defines a plurality of representations of the component with each representation defining one possible material condition and flaw size condition at a one component location.

5. The method of claim 4 wherein failure of the component is determined when crack growth becomes unstable.

6. The method of claim 2 wherein tests conducted on the component are selected responsive to a difference between the cycle-based risk limit and PoF(N).

7. The method of claim 3 wherein the direct simulation probabilistic fracture mechanics method identifies high stress regions of the component.

8. The method of claim 1 wherein the time-based acceptable risk limit comprises a first risk limit and a second risk limit, wherein the probability of failure PoF(N) equals the first risk limit when N=i and equals the second risk limit when N=j, and wherein when N=i a first action associated with the first risk limit is performed and when N=j a second action associated with the second risk limit is performed.

9. The method of claim 8 wherein the first action comprises performing an inspection of the component and the second action comprises removing the component from service.

10. The method of claim 1 wherein the machine component is an element of a gas turbine.

11. The method of claim 1 wherein the machine component comprises a rotor disc of a gas turbine.

12. The method of claim 1 wherein a plurality of machine components comprise a machine, the method further comprising selecting "C" machine components and executing the method on the "C" machine components.

13. The method of claim 1 wherein the machine component is an element of a gas turbine and the operational profile comprises a unique operational profile based on start up and shut down conditions of a single gas turbine or based on an average of start up and shut down conditions for a plurality of gas turbines.

14. The method of claim 1 wherein the step of determining comprises:
defining a plurality of representations of the component from material property scatter data and flaw-size scatter data of the component, wherein each representation is defined by one possible material condition and flaw-size condition;
for each individual representation, selecting a component location and determining whether the individual representation fails after a given number of cycles N due to crack growth at the selected location, the crack growth determined on the basis of the material condition and the flaw-size condition at the selected location, wherein failure of the individual representation is determined if the crack growth is determined to be unstable;
determining a number of the representations that failed after N cycles;
determining the probability of failure of the component after N cycles from PoF $(N)=N_f/S$, wherein:
PoF(N) is the probability of failure of the component after N cycles;
$N_f$ is the number of representations that are determined to have failed after N cycles; and
S is the total number of representations.

15. The method of claim 14 further comprising determining a number of cycles M wherein PoF(M) equals a predetermined probability of failure value and wherein the step of operating comprises inspecting the machine component when the component has operated for M cycles.

16. The method of claim 14 further comprising determining a number of cycles L wherein PoF(L) equals a predetermined probability of failure value and wherein the step of operating comprises removing the machine component from service when the component has operated for L cycles.

17. A method for operating a machine component under stress, the method comprising:
determining a probability of failure of the component as a function of N cycles, PoF(N);
selecting a time-based acceptable risk limit for the component;
selecting an operational profile for the component;
converting the probability of failure as a function of N cycles to a time-based probability of failure using the operational profile;
comparing the time-based acceptable risk limit with the time-based probability of failure values; and
operating the machine component responsive to results of the comparing step.

18. The method of claim 17 wherein the step of operating the machine component comprises one of conducting component maintenance, scheduling a component downtime, scheduling a maintenance task, testing the component, and removing the component from service.

19. The method of claim 17 wherein the step of determining comprises using direct simulation probabilistic fracture mechanics.

20. A method for operating a machine component under stress, the method comprising:
determining a probability of failure of the component as a function of a first variable;
selecting an acceptable risk limit for the component as a function of a second variable;
selecting an operational profile for the component relating the first and second variables;
using the operational profile for the component, expressing the probability of failure and the acceptable risk limit as a function of a same one of the first and second variables;
comparing the acceptable risk limit and the probability of failure with both expressed as a function of the same one of the first and second variables; and
operating the machine component responsive to results of the comparing step.

* * * * *